United States Patent
Nelson et al.

(10) Patent No.: US 12,416,980 B2
(45) Date of Patent: Sep. 16, 2025

(54) HAND CUSTOMIZABLE HUMAN INPUT DEVICE

(71) Applicant: Lenovo (Singapore) Pte. Ltd., Singapore (SG)

(72) Inventors: Lindsay Nelson, Morrisville, NC (US); Inna Zolin, Morrisville, NC (US); Faisal Mohamed, Morrisville, NC (US); Allen Richey, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/129,343

(22) Filed: Mar. 31, 2023

(65) Prior Publication Data

US 2024/0329756 A1 Oct. 3, 2024

(51) Int. Cl.
*G06F 3/0354* (2013.01)
*G06F 3/041* (2006.01)
*G06F 3/16* (2006.01)

(52) U.S. Cl.
CPC ...... *G06F 3/03543* (2013.01); *G06F 3/04144* (2019.05); *G06F 3/167* (2013.01); *G06F 2203/04105* (2013.01)

(58) Field of Classification Search
CPC .................................................. G06F 3/03543
See application file for complete search history.

(56) References Cited

U.S. PATENT DOCUMENTS

| | | | | |
|---|---|---|---|---|
| 5,757,360 A | * | 5/1998 | Nitta | G06F 3/0346 345/157 |
| 6,115,030 A | | 9/2000 | Berstis et al. | |
| 6,229,527 B1 | * | 5/2001 | Shearn | G06F 3/039 345/157 |
| 6,616,108 B1 | * | 9/2003 | Brophy | G06F 3/03543 248/118.1 |
| 6,664,947 B1 | * | 12/2003 | Vinogradov | G06F 3/03543 345/157 |
| 10,599,233 B1 | * | 3/2020 | Amalou | G06F 3/0346 |
| 2001/0024192 A1 | * | 9/2001 | Lewis | G06F 3/03543 345/163 |
| 2003/0074766 A1 | * | 4/2003 | Tillim | A61B 17/2909 16/430 |

(Continued)

OTHER PUBLICATIONS

Rendl et al., PyzoFlex: Printed Piezoelectric Pressure Sensing Foil, Oct. 2012, DOI:10.1145/2380116.2380180 Conference: 25th annual ACM symposium on User interface software and technology—UIST'12 at: Boston (11 pages).

(Continued)

*Primary Examiner* — William Boddie
*Assistant Examiner* — Andrew B Schnirel
(74) *Attorney, Agent, or Firm* — Brian J. Pangrle

(57) ABSTRACT

A human input device can include a processor; memory accessible to the processor; communication circuitry operatively coupled to the processor; pressure sensors operatively coupled to the processor and assignable to different navigation commands communicable via the communication circuitry; and a deformable material disposed over the pressure sensors that, upon deformation, provides for assignment of one or more of the pressure sensors to one or more of the different navigation commands.

20 Claims, 10 Drawing Sheets

(56) References Cited

U.S. PATENT DOCUMENTS

| | | | | |
|---|---|---|---|---|
| 2005/0110773 A1* | 5/2005 | Chapman | ............ | G06F 3/04815 345/174 |
| 2010/0295787 A1* | 11/2010 | Tang | ................... | G06F 3/03543 345/166 |
| 2014/0214430 A1* | 7/2014 | Wang | ............... | H04N 21/42222 704/275 |
| 2014/0267040 A1* | 9/2014 | Theytaz | .................. | G06F 3/016 345/163 |

OTHER PUBLICATIONS

Skalsky AJ, McDonald CM. Prevention and management of limb contractures in neuromuscular diseases. Phys Med Rehabil Clin N Am. Aug. 2012;23(3):675-87. doi: 10.1016/j.pmr.2012.06.009. PMID: 22938881; PMCID: PMC3482407. (15 pages).

Taiwan Alpha Electronics, Pressure Sensor Array, MMT1011, 2022 (1 page).

Taiwan Alpha Electronics, Pressure Sensor Array, MMS1011, 2022 (1 page).

Nuriye Kübra Bayraktar, Esin Özşahin, Anthropometric measurement of the hand, East J Med 23(4): 298-301, 2018, DOI: 10.5505/ejm.2018.03164 (4 pages).

Hand-moldable plastic, Product ID: 2504, https://www.adafruit.com/product/2504 (2015) (1 page).

Taiwan Alpha Electronics, Pressure Sensor Array, MF02, 2022 (2 pages).

Lane R, Nallamothu SV. Claw Hand. [Updated Aug. 8, 2023]. In: StatPearls [Internet]. Treasure Island (FL): StatPearls Publishing; Jan. 2024-. Available from: https://www.ncbi.nlm.nih.gov/books/NBK507781/ (7 pages).

Tap Strap 2, Amazon.com, https://www.amazon.com/TAPWITHUS-Tap-Strap-Wearable-Controller/, 2021 (1 page).

* cited by examiner

US 12,416,980 B2

HAND CUSTOMIZABLE HUMAN INPUT DEVICE

TECHNICAL FIELD

Subject matter disclosed herein generally relates to input devices such as a human interface device for computing and display devices.

BACKGROUND

A computer mouse can include buttons and a scroll wheel for receipt of input for a computing device, a display device, and/or another electronic device. For various users, a computer mouse may be suboptimal or impractical for use.

SUMMARY

A human input device can include a processor; memory accessible to the processor; communication circuitry operatively coupled to the processor; pressure sensors operatively coupled to the processor and assignable to different navigation commands communicable via the communication circuitry; and a deformable material disposed over the pressure sensors that, upon deformation, provides for assignment of one or more of the pressure sensors to one or more of the different navigation commands. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1A:
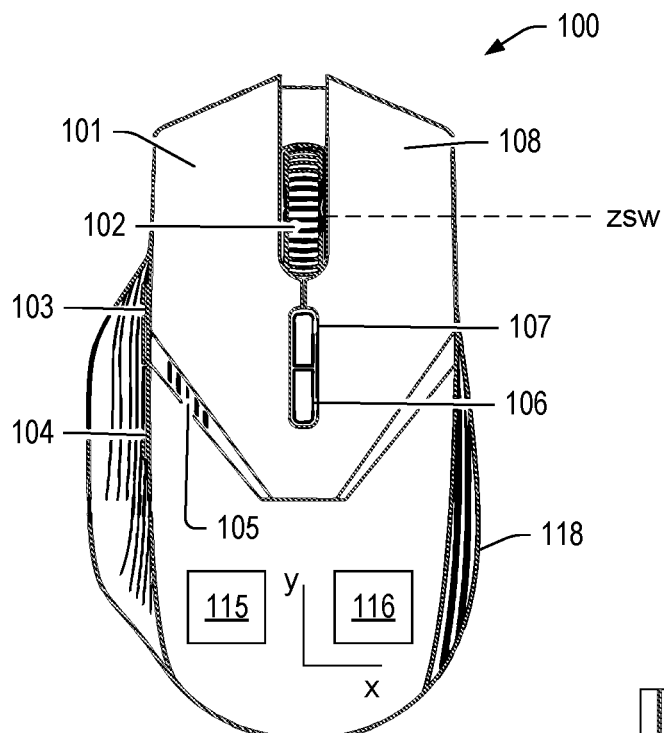
FIG. 1A, FIG. 1B, and FIG. 1C are views of an example of a computer mouse.
Figure 1C:
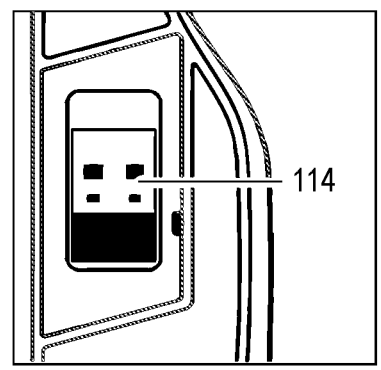
Figure 1B:
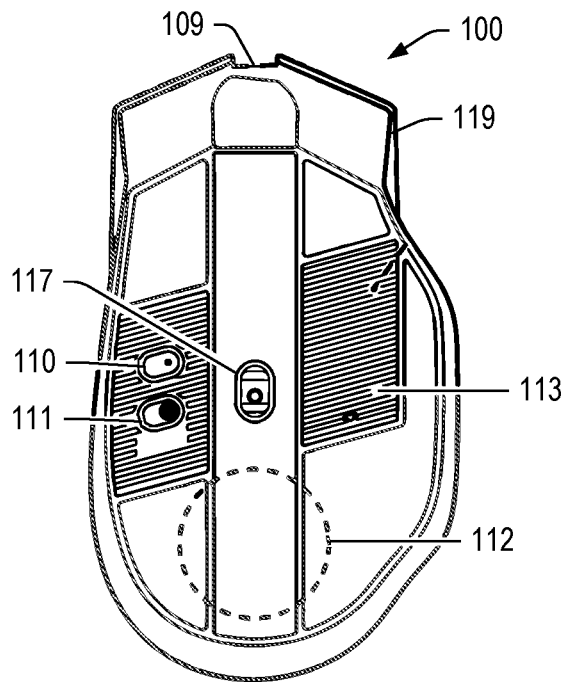

FIG. 1A, FIG. 1B and FIG. 1C show views of an example of a computer mouse 100. The computer mouse 100 can be a hand-held pointing device that can detect two-dimensional motion relative to a surface. As an example, such motion can be translated into motion of a pointer on a display, for example, for control of one or more graphical user interfaces rendered to a display of a display device. As shown, the computer mouse 100 may be defined in part using a coordinate system such as, for example, a Cartesian coordinate system where, for example, a longitudinal axis of the computer mouse 100 can be in a direction of a y-axis and a latitudinal axis of the computer mouse 100 can be in a direction of an x-axis where a z-axis can be used to define heights for one or more features.

As shown, the computer mouse 100 can include a left mouse button 101, a scroll wheel 102 (e.g., optionally including a middle button), a forward button and/or page up button 103, a backward button and/or page down button 104, a DPI level indicator and/or a charging indicator 105, a DPI down button 106, a DPI up button 107, a right mouse button 108, a USB-C port 109, a BLUETOOTH pairing button 110 (e.g., for BLUETOOTH circuitry and/or other wireless circuitry), a 2.4G/OFF/BLUETOOTH switch 111, a wireless charging area 112, a wireless USB receiver compartment 113, a wireless USB receiver 114, circuitry 115, a power source 116 (e.g., a rechargeable battery), and an optical assembly 117 (e.g., for sensing position and/or motion with respect to a surface). As an example, a computer mouse may include a cord with a connector such as, for example, a USB connector. As shown, the computer mouse 100 can include a housing that can be formed from an upper housing component 118 and a lower housing component 119 where the scroll wheel 102 is accessible via an opening in the upper housing component 118 and where the optical assembly 117 can be positioned with respect to an opening in the lower housing component 119.

As an example, various features of the computer mouse 100 can be mechanical, electrical, optical, magnetic, etc. For example, the scroll wheel 102 can be a mechanical part that may utilize one or more types of other parts to encode rotation of the scroll wheel 102 about a scroll wheel axis. As an example, the optical assembly 117 can include one or more LEDs, one or more lasers, one or more optical elements, one or more sensors, etc.

As shown in the example of FIG. 1A, the scroll wheel 102 may be rotatable forwardly and backwardly (along a y-axis direction and rotatable about a scroll wheel axis, zsw, that may be substantially parallel to the x-axis (e.g., plus or minus 25 degrees).

As an example, the computer mouse 100 may be a surface-independent optical mouse that includes an optoelectronic sensor (e.g., optionally a low-resolution video camera, etc.) as a type of circuitry to capture successive images of a surface on which the computer mouse 100 may operate. As an example, the circuitry 115 can include optoelectronic circuitry, one or more special-purpose image-processing chips, and one or more other types of circuitry.

As an example, the USB receiver 114 can be storable in a bay of the computer mouse 100 and removed to be plugged into a port of an electronic device. As an example, the computer mouse 100 may be operable with different electronic devices, optionally at the same time or in a selectable manner. For example, consider the computer mouse 100 as including a switch that can switch connection from one electronic device to another electronic device where, for example, each of the electronic devices may include a suitable receiver (e.g., an instance of the USB receiver 114, etc.).

Figure 2:
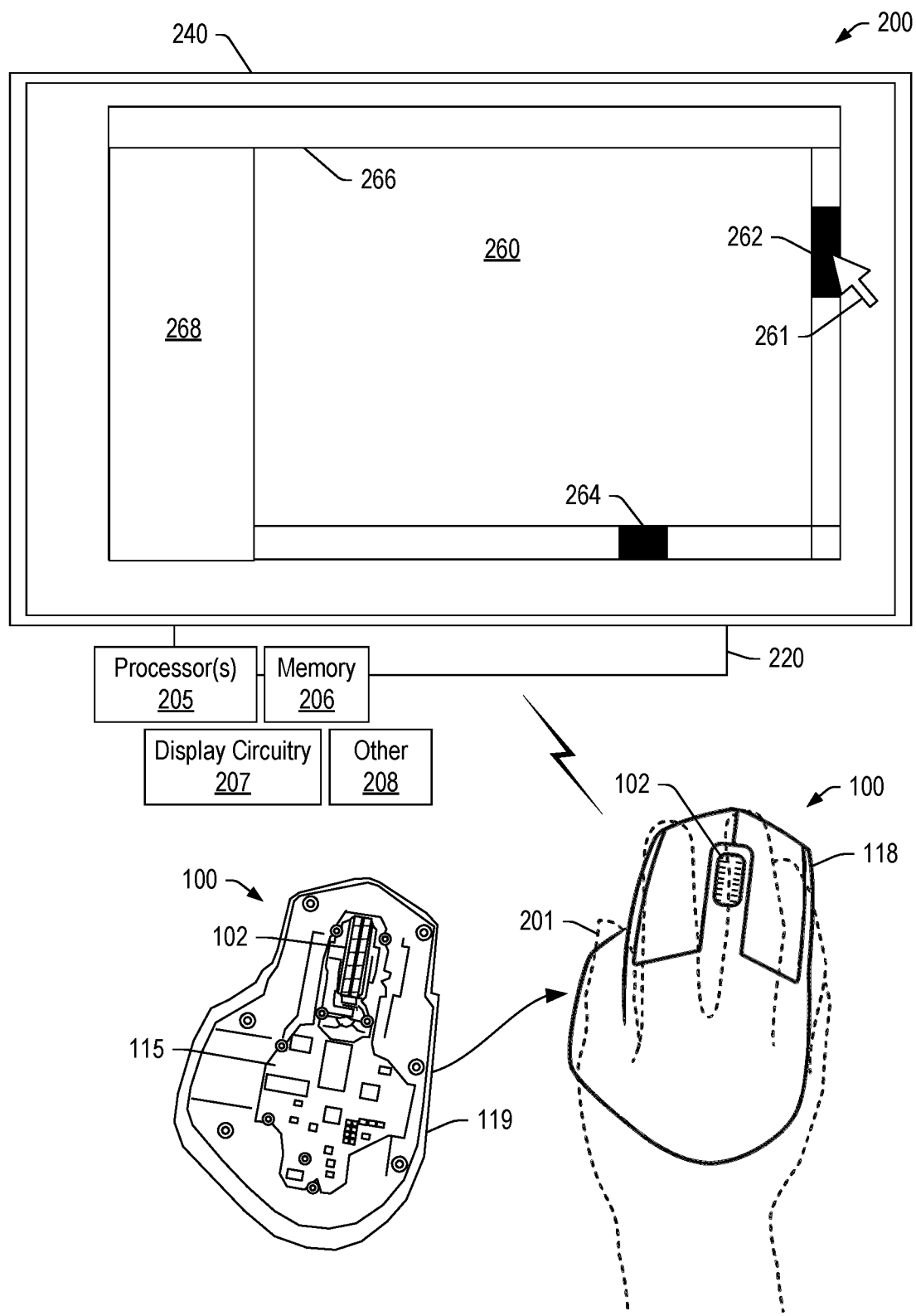
FIG. 2 is a diagram of an example of a system.

FIG. 2 shows an example of a system 200 that can include one or more processors 205, memory 206 accessible to at least one of the one or more processors 205, display circuitry 207 and one or more other components 208, which can include electronic circuitry, instructions stored in the memory 206 and executable by at least one of the one or more processors 205, etc.

As shown, the system 200 can be operable using the computer mouse 100, which may be manipulated using a human hand 201 that can rest on the computer mouse 100 where one or more fingers can interact with various features of the computer mouse 100.

As shown in FIG. 2, the computer mouse 100 can include the circuitry 115. The circuitry 115 can include, for example, charging circuitry (e.g., an integrated circuit that provides for dual mode regulation to convert battery voltage into voltages for other integrated circuits, etc.); a main processor that can read signals from sensors and convert data into x,y cursor positions, etc.; a co-processors that can handle tasks such as pulsing LEDs and/or lasers, power management, etc.; a multi-axis gyroscope and/or accelerometer (e.g., for multi-dimensional position determinations, etc.); a thermopile detector that can detect movement under a laser; a wireless radio (e.g., BLUETOOTH circuitry, etc.); etc.

As to the main processor, consider a processor that can include one or more features of an ARM processor, which may have a 32-bit RISC core and associated memory. As to the co-processor, consider a co-processor that can include one or more features of an ATMEL processor, which can be a low-power CMOS 8-bit RISC microcontroller with associated memory.

As an example, the computer mouse 100 can include firmware and/or other instructions storable in memory and executable by one or more processors. As explained, the computer mouse 100 can be operatively coupled via wire and/or wirelessly (e.g., depending on features) to one or more electronic devices such that human interactions with the computer mouse 100 can cause actions to be taken by one or more electronic devices. As an example, a human interaction with the computer mouse 100 may be a physical interaction that involves hand contact. As explained herein, where the computer mouse 100 includes recognition circuitry, the computer mouse 100 may optionally act without physical human contact, for example, via operation of the motor assembly and/or via response to sound (e.g., a human utterance, etc.).

As shown, the system 200 can include a base 220 and a display device 240, which may be configured as separate interoperable components, as a laptop computer, as an all-in-one (AIO) computer, etc. As shown, the display device 240 can be utilized to render a graphical user interface (GUI) 260 that can include a cursor 261 (e.g., pointer, etc.), a vertical scroll bar 262, a horizontal scroll bar 264, a horizontal menu 266 and a vertical menu 268. In such an example, the computer mouse 100 may be utilized to control one or more features of the GUI 260. As an example, the cursor 261 may be moved to control scrolling. As an example, the computer mouse 100 may include one or more programmable features. For example, consider programmable buttons, etc., that can be programmed with one or more commands. For example, consider a side button being programmed with an undo command (e.g., Ctrl+Z); noting that various other commands may be programmed in association with one or more buttons, etc.

While the example of FIG. 2 shows the GUI 260 as being akin to an application GUI for various tasks (e.g., word processing, document reading, web browsing, spreadsheet editing, etc.), the system 200 may be suitable for various other tasks, which can include video tasks, gaming tasks, etc. For example, the system 200 can include features of a gaming computer that can execute one or more computer games, which may be interactive games for local and/or remote interactions.

Figure 3:
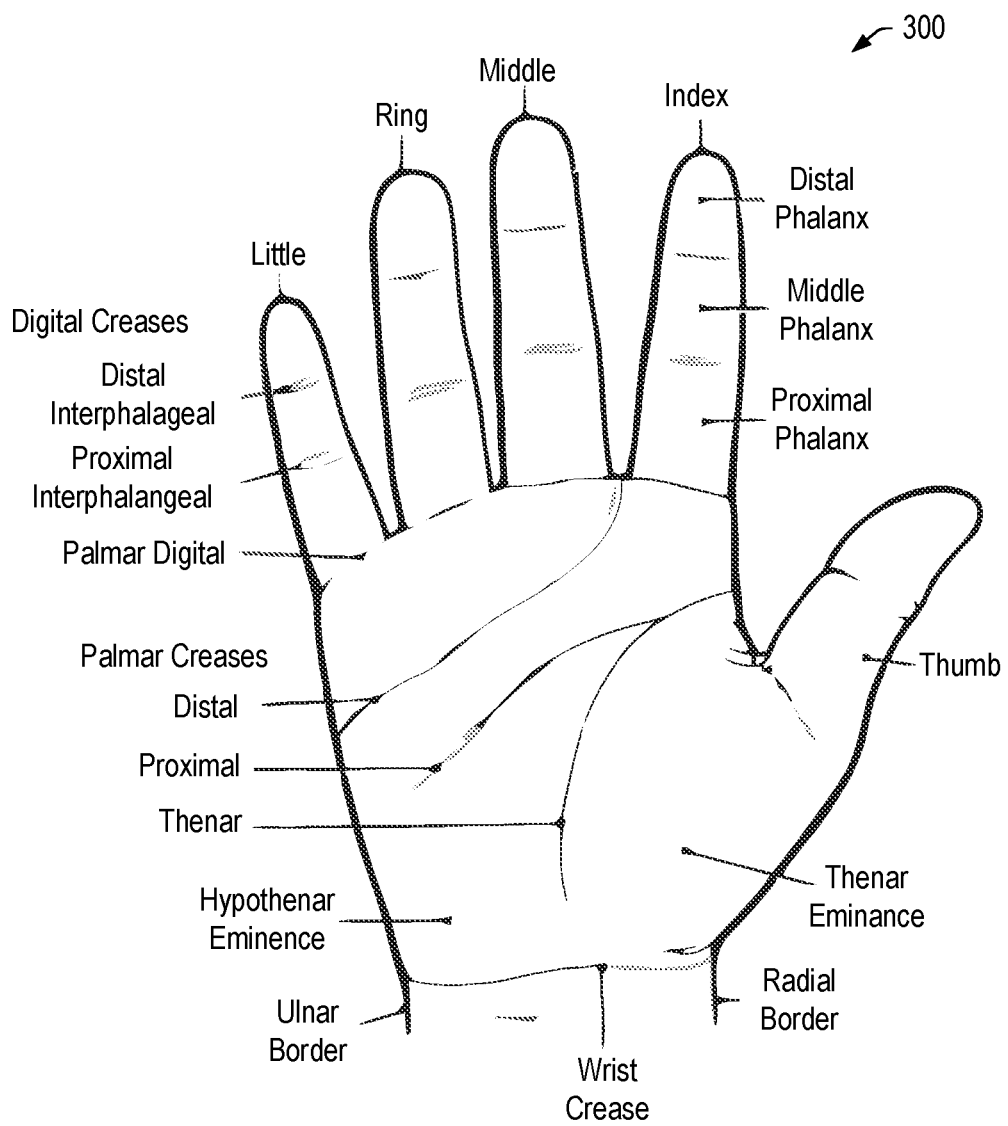
FIG. 3 is a series of diagrams of examples of hands.

FIG. 3 shows parts of a human hand 300, which include five fingers (thumb, index, middle, ring and little), various digital creases (distal interphalangeal, proximal interphalangeal, palmar digital), various palmar creases (distal, proximal, thenar), and other features such as the thenar eminence, the hypothenar eminence, the ulnar border, a radial border and a wrist crease.

A hand may be a normally functioning hand and suitable for use with a computer mouse such as the computer mouse 100 of FIG. 1 and FIG. 2. However, various types of diseases, injuries, defects, etc., can result in having a hand that cannot perform all of the functions of a normally functioning hand. Such types of issues can result in a computer mouse such as, for example, the computer mouse 100, as being suboptimal or practically unusable.

FIG. 3 shows an example of a hand 310 that is in a so-called contracted state, which may be referred to as a claw state. For example, limb contractures can be a common impairment in neuromuscular diseases (NMD). They can contribute to increased disability due to decreased motor performance, mobility limitations, reduced functional range of motion, loss of function for activities of daily living (ADL), and increased pain. The pathogenesis of contractures is multifactorial. Myopathic conditions are associated with more severe limb contractures in comparison to neuropathic disorders (see, e.g., Skalsky A J, McDonald C M. Prevention and management of limb contractures in neuromuscular diseases. Phys Med Rehabil Clin N Am. 2012 August; 23(3):675-87. doi: 10.1016/j.pmr.2012.06.009. PMID: 22938881; PMCID: PMC3482407, which is incorporated by reference herein).

As to the size of a hand, that the average length of the right hand as being 183.9±0.8 mm and 169.7±2.0 mm for males and females respectively and the average width of the right hand as being 87.5±0.7 mm and 77.6±1.2 mm for males and females respectively (see, e.g., Bayraktar et al., "Anthropometric measurement of the hand", East J Med 23(4): 298-301, 2018 (DOI: 10.5505/ejm.2018.03164), which is incorporated by reference herein).

Figure 4:
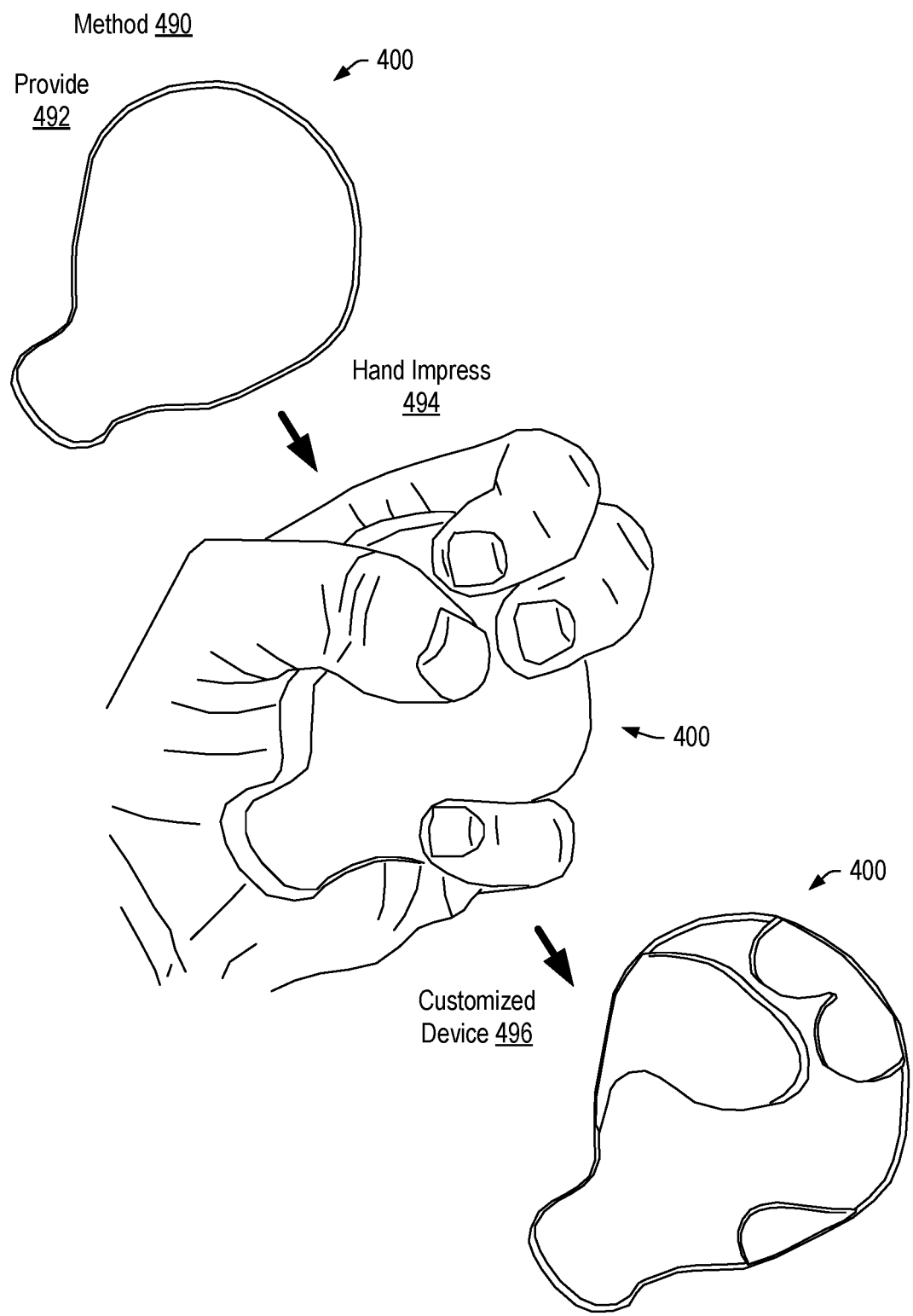
FIG. 4 is a series of diagrams of an example of a method for a hand customizable human input device (HC-HID)

FIG. 4 shows an example of a hand customizable human input device (HC-HID) 400 along with an example of a method 490. As shown, the HC-HID 400 can be provided 492, subjected to a hand impress 494 to result in customized device 496, which is a customized version of the HC-HID 400.

Figure 5:
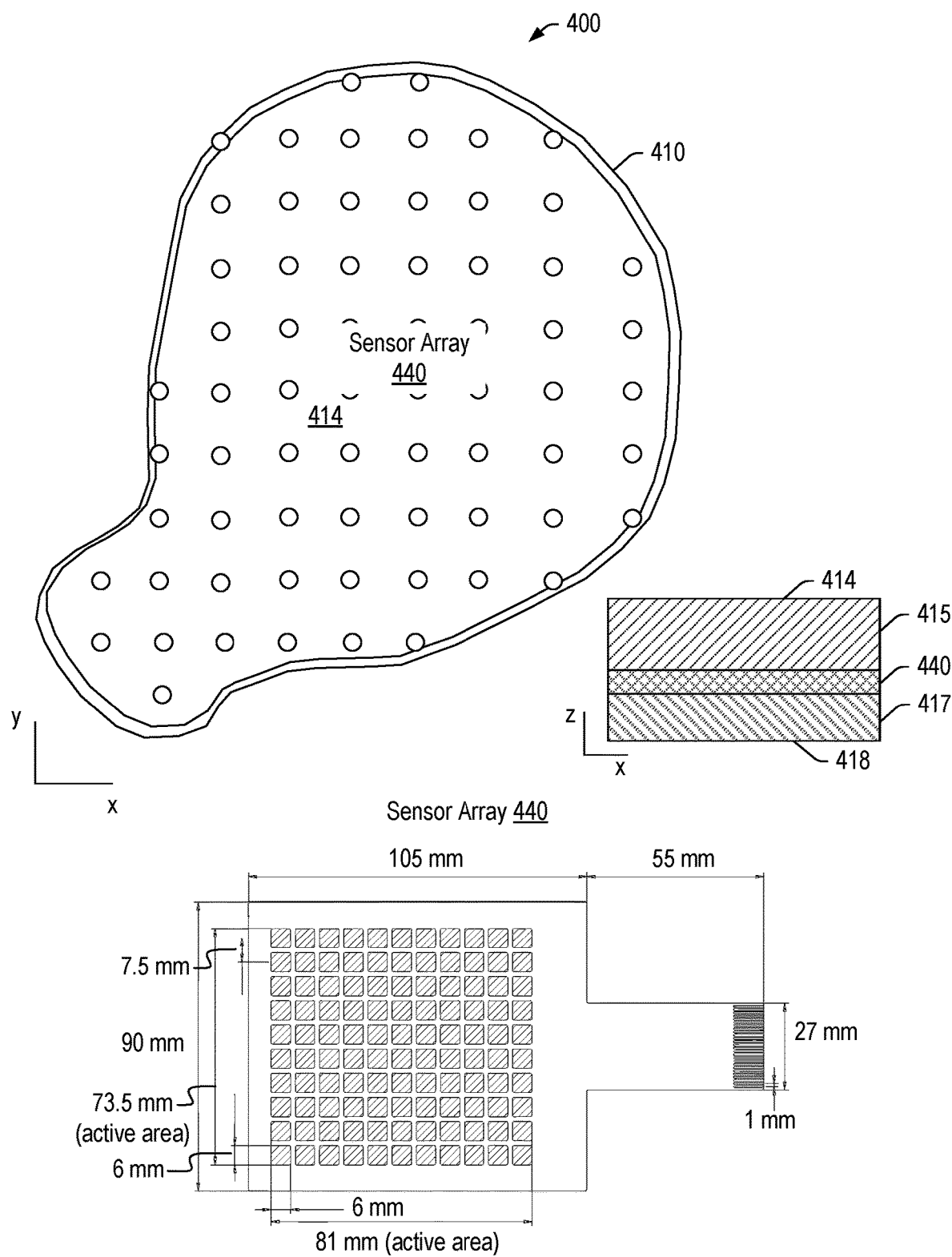
FIG. 5 is a series of diagrams of an example of a HC-HID and examples of sensor arrays.

FIG. 5 shows an example of the HC-HID 400 as including a perimeter 410 and a surface 414 along with an example of a sensor array 440. In such an example, the surface 414 can be a hand moldable surface, for example, formed of a suitable material, which may be a polymeric material, a ceramic material, a composite material, a foam, a gel, etc. As an example, the material may be plastically deformed by a hand. In such an example, the material may retain its deformed shape and/or be subjected to one or more processes that cause it to retain its deformed shape, or, depending on the material, to regain its original shape such that it may be deformed a subsequent time.

In the example of FIG. 4, the HC-HID 400 is shown with respect to a Cartesian coordinate system with x, y and z coordinates. As shown in an approximate cross-sectional view, the HC-HID 400 can include opposing surfaces 414 and 418 where the sensor array 440 may be disposed between materials 415 and 417, which may be the same material or different materials. As an example, the surface 418 may be a palm side surface while the surface 414 is a surface that faces away from a palm. In such an example, the sensor array 440 may be responsive to force applied to the surface 414, which may be deformable through deformation of the material 415.

As to processes, consider a thermoforming process where, for example, the HC-HID 400 may be hermetically sealed (e.g., waterproof or a high degree of water resistance); noting that a port may be provided with a port plug (e.g., consider a USB port plug). In such an example, consider warming water in a container large enough to accept the HC-HID 400 followed by introducing the HC-HID 400 into the container to submerge it, optionally using tongs or a specialized tool. In such an example, the HC-HID 400 can include material that softens (e.g., in a few minutes or less) and that will remain relatively soft such that a hand can impress the material to thereby shape the material. For example, the HC-HID 400 can be fit into a hand where the hand applies pressure (e.g., with fingers, etc.). After making an impression, the HC-HID 400 can be cooled to a hardened state. While a thermoforming example is mentioned, one or more other processes may be used, which may include use of ceramics (e.g., green state followed by heating), curable materials (e.g., via heat, UV, additives, etc.), etc.

As explained, users with certain muscular, neurological, or physical disabilities can have trouble using a computer mouse. For such users, the HC-HID 400 may provide a way to navigate a computer screen without requiring arm or wrist movement and, for various users, also operate without demand of fine motor movements of the fingers, face, eyes, head, etc.

As explained, a HC-HID can be a moldable device with embedded sensors that users can be configured to perform various mouse functions (e.g., cursor movement, click, and drag). As an example, a HC-HID can use a combination of location of applied pressure and amount of applied pressure to control a cursor.

As an example, a sensor array may include a number of pressure sensing cells that may provide multitouch functionality. For example, consider a pressure sensor array of tens to 100 or more pressure sensing cells, enabling multitouch functionality with position and force detection. Such an array may provide for sensing of force of approximately 10 g or more (e.g., force sensitivity range). For sake of comparison, a keyboard with a relatively light key actuation force may be less than 30 g.

As an example of a sensor array, consider the ALPHA MMS1011-N-026-A01 sensor array or the ALPHA MMT1011-N-026-A01 sensor array, which can include 100 or more pressure sensing cells with position (e.g., x and y) and force detection (e.g., z) (Taiwan Alpha Electronic Co., Ltd.). FIG. 5 shows the example sensor array 440 as including an active area of 73.5 mm by 81 mm (see, e.g., the ALPHA MMS1011 sensor array) with individual sensors of 6 mm×6 mm and a total of 110 individual sensors. As an example, a sensor array may include a 71 mm by 79 mm active area (see, e.g., the ALPHA MMT1011 sensor array). Such a sensor array can include layers such as a circuit conductor layer, a spacer layer, a carbon layer, an adhesive layer, and provide an inverse curve of force and resistance (e.g., less force, more resistance). As an example, a sensor array may be trimmed or otherwise smaller in size than the aforementioned ALPHA sensor arrays. As explained, average width of a palm can be 87.5±0.7 mm and 77.6±1.2 mm for males and females where, for example, a HC-HID can include a sensor array with at least a portion of the sensor array within a width of a palm.

As an example, a sensor array can be supported on a substrate that may be rigid and/or may be supported on a substrate that may be flexible. In the example of FIG. 5, the sensor array 440 is supported on a relatively rigid substrate, which may be flexed to some extent through use of hand pressure. As an example, a sensor array may be provided as a board that can include sensor circuitry and optionally other circuitry (see, e.g., consider one or more types of computer mouse circuitry).

As an example, a sensor array may include one or more ferroelectric materials that may support pyroelectric effects and/or piezoelectric effects. As an example, a sensor array may include a sandwich structure of layers, which may be printable on a suitable substrate. As to pyroelectric effect, the heat of a finger may be sufficient for sensing a change indicative of a user's intention. For example, a user may apply pressure that brings a fingertip closer to a sensor that can sense heat energy given off by the fingertip. An article by Rendl et al. (2012), "PyzoFlex: Printed Piezoelectric Pressure Sensing Foil", UIST'12-Proceedings of the 25th Annual ACM Symposium on User Interface Software and Technology (10.1145/2380116.2380180) is incorporated by reference herein.

As an example, a HC-HID can include one or more sensors such as, for example, one or more of the sensors described in U.S. Pat. No. 6,115,030, entitled "Trackpoint device", which is incorporated by reference herein ('030 patent). The '030 patent describes an example of a capacitive sensor input device which includes a movable stud having a top portion for manipulation by a user and a conductive bottom portion is connected to a planar surface, such as a circuit board by means of an elastomeric, adhesive connector. In such an example, a plurality of sensors are disposed on the planar surface where respective capacitances between the conductive bottom portion and respective ones of the sensors are used as input to another electronic device, such as a computer, set top box or gaming device. In such an example, as the capacitances change according to user manipulation of the movable stud elements of the user interface are moved correspondingly.

As an example, a HC-HID can include a plurality of capacitive sensors, which may include respective movable studs, which may be relatively short and be embedded in a hand deformable material. In such an example, a HC-HID may provide for directional force sensing. For example, a force vector may be determined with direction and magnitude responsive to application of force by a hand of a user. As an example, one or more sensors may be responsive to force applied by a hand to perform one or more actions of a trackpoint device.

As an example, a HC-HID can include one or more power sources such as, for example, one or more batteries. As an example, a HC-HID can be cordless or corded. As an example, a HC-HID can include a port such as, for example, a serial port (e.g., a USB port), which may provide for transmission of one or more of power and data.

As an example, a HC-HID can include internal heating circuitry. For example, consider resistance heating circuitry that can cause heating of moldable material such that the moldable material can be impressed by hand pressure for hand customization of the moldable material. In such an example, the HC-HID can be heated using heating circuitry, which can include temperature regulated control circuitry, until moldable material reaches a certain temperature, which may be, for example, at or above a glass transition temperature where the moldable material is or includes a polymeric material. In such an example, upon cessation of heating, the moldable material can cool to below the certain temperature such that a hand-impressed shape can be retained.

The term glass transition can be defined as process in which a polymer melt changes on cooling to a polymer glass or a polymer glass changes on heating to a polymer melt. Glass transition in polymers is related to dynamics of macromolecules in an amorphous phase. Glass transition temperature on heating corresponds to onset of cooperative segmental motions, hence above this temperature deformability of a polymer increases, for example, a transition from a glassy state to a rubbery state can take place. Glass transition temperature depends on chain rigidity and intermolecular interactions. Restrictions of the molecular mobility increase glass transition temperature. In thermosets the restrictions tend to be due to chemical crosslinks. For example, more crosslinkings results in a higher glass transition temperature and a lower modulus drop. In semicrystalline thermoplastics, crystalline regions can act as physical crosslinks. Higher crystallinity tends to result in a higher glass transition temperature and a lower modulus drop. In amorphous thermoplastic homopolymers (e.g., no crosslinks), modulus drop during glass transition tends to be quite large.

As an example, a HC-HID can include one or more types of material that provide for moldability. As explained, a material may be a polymeric material, which may be or include a thermoset, a thermoplastic and/or one or more other types of polymeric materials.

As an example, a moldable material may be in the form of particles within a shell, which may be a flexible shell. As an example, consider a shell that contains polymorph plastic beads with a relatively low melting point (e.g., approximately 40 degrees C. to approximately 100 degrees C.). Such material can be heated (e.g., internal HC-HID heater, heated water, etc.) where the beads melt and start sticking together into a wax-like blob. Such material may then be shaped by hand and left to harden. Once hardened, the material can have the feel and durability of polyethylene and a translucent white color. Such material can be re-melted if re-shaping is desired. For example, consider reheating to soften and re-shape followed by re-cooling.

Polymorph material can be or include polycaprolactone (PCL), which is a biodegradable polyester with a relatively low melting point of around 60 degrees C. and a relatively low glass transition temperature of about minus 60 degrees C. such that PCL is relatively flexible and rubbery at body temperature (e.g., approximately 37 degrees C.). Such a material can provide for deformation by hand to a shape for a HC-HID where the material remains suitable for transmission of force from a hand to one or more sensors of the HC-HID.

As explained, a HC-HID can include one or more types of material, which may include a thermoplastic, or thermosoft plastic, as a plastic polymer material that becomes pliable or moldable at a certain elevated temperature and solidifies upon cooling.

As an example, a HC-HID can include a memory foam. Memory foam derives its viscoelastic properties from several effects, due to the material's internal structure. A network effect can exert force to restore the foam's structure when it is deformed. This effect can be generated by deformed porous material pushing outwards to restore its structure against an applied pressure. As an example, a memory foam can be heated and cooled. For example, consider heating a memory foam to make it deformable followed by cooling such that the network effect is limited. In such an example, a memory foam may be heated, deformed and cooled to retain its deformed shaped. As explained, a deformed shape can be a hand deformed shape. Memory foam can be primarily polyurethane with additional chemicals that increase its viscosity and density. Memory foam may be referred to as viscoelastic polyurethane foam, or low-resilience polyurethane foam (LRPu). As explained, foam may be customized to be deformable and substantially non-deformable at different temperatures.

As to a thickness of a HC-HID, it may be in a range of approximately 0.5 cm to approximately 10 cm thick. For example, a foam material may be relatively thick and compressible to form a HC-HID that has a lesser thickness. As explained, a pressure sensor array can be included in a HC-HID where deformed material can transmit pressure applied by one or more parts of a hand such that the pressure sensor array can detect the applied pressure or applied pressures, which, in turn, can be utilized to control one or more actions of a computing device (e.g., mouse actions, etc.).

Figure 6:
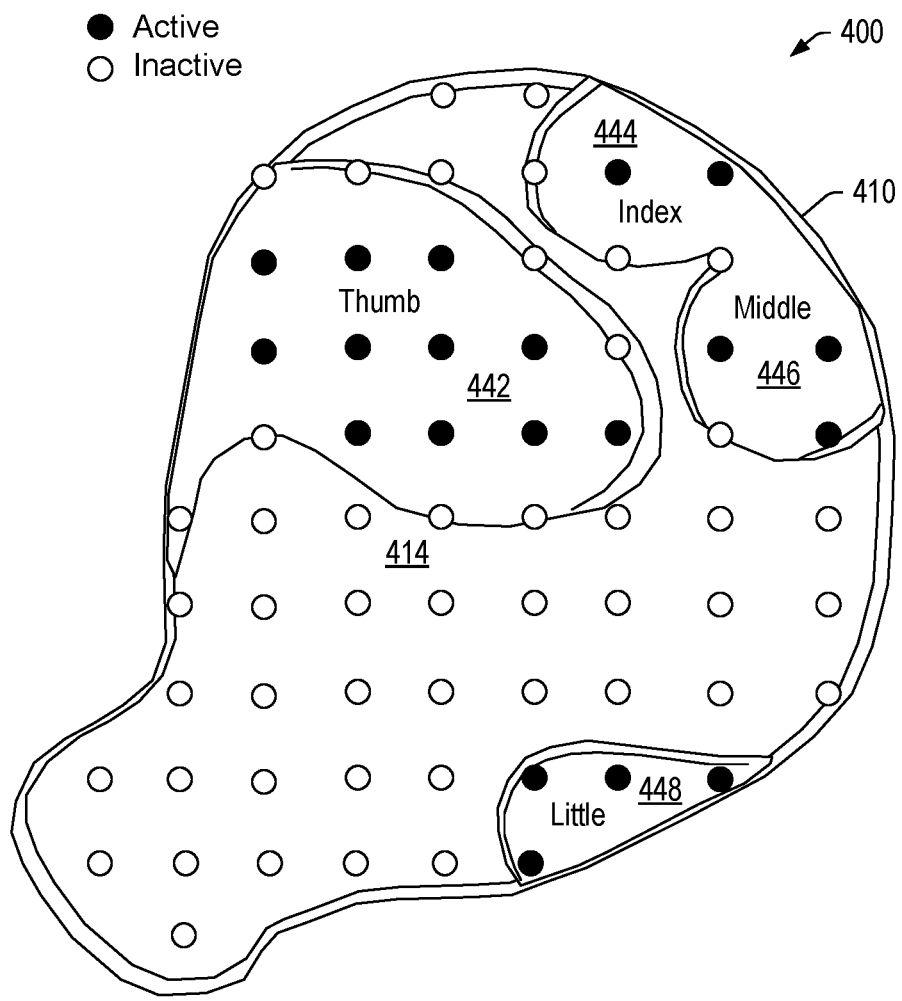
FIG. 6 is a diagram of an example of a HC-HID as customized by a hand.

FIG. 6 shows an example of the HC-HID 400 as being impressed such that various regions are defined, for example, as recessed regions. For example, consider a thumb recess 442, an index finger recess 444, a middle finger recess 446 and a little finger recess 448. As shown, an impression process may also provide for selection of particular sensors. For example, upon application of pressure, sensors may become active or activated.

As an example, the HC-HID 400 can include a bus that is operatively coupled to the sensors of the sensory array 440. In such an example, the bus (e.g., bus circuitry) may be capable of determining which sensors are active or not or, for example, being able to associate a signal with a sensor and its location or associated region. As an example, sensors may be redundant in that a number of sensors can be utilized for sensing user input. For example, a user with limited mobility of the thumb may not be able to replicate exact thumb movements as may have been utilized to shape material of the HC-HID 400. In such an example, a number of sensors of the sensor array 440 may be available for input, for example, one or more of the sensors of the thumb recess 442 may be operable for user input. In such a manner, the HC-HID 400 can be robust and usable even when a user's ability to move her hand changes somewhat from day to day.

As an example, the HC-HID 400 can include an array density. For example, the sensor array 440 may have a density that is greater than approximately two sensors per square centimeter. In such an example, a fingertip may have an area of approximately 1 $cm^2$ such that at least one sensor can be associated with an impressed area of that fingertip. As an example, an array density may be greater than two sensors per 1 $cm^2$ such that an increased probability exists that a fingertip can be associated with multiple sensors (e.g., two or more sensors), which can provide for some amount of redundancy and/or some amount of force sensing such that an amount of force can be determined.

As an example, a sensor may be a binary sensor that has an off state and an on state. As an example, a sensor may have more than two states where it can sense levels such as, for example, levels of pressure (e.g., force) as may be applied by a hand. For example, a user may have an ability to apply a first level of force and a second, higher level of force. In such an example, the two levels of force may be distinguished by a force threshold such that each level of force may be associated with a different HID function. As another example, as mentioned, a hand may be in a somewhat contracted state such that there is a base level of pressure that is applied to a HC-HID. In such an example, the base level may be sensed and/or a threshold set that is above the base level to be indicative of a user's intent to have the HC-HID sense and cause some type of action.

As an example, a HC-HID can be operatively coupled to a computing device where, for example, some amount of automation may be available for assignment of hand pressure to one or more functions.

As an example, after and/or during molding a HC-HID to a user's hand, an interfacing application can connect the HC-HID to a computing device equipped with various HC-HID capabilities. For example, consider a learning mode where the application can guide a user to apply pressure to configure the HC-HID. As another example, consider adaptive behavior training that provides a way for a user to give feedback on the HC-HID's level of success on executing a desired movement or action. As an example, an application can implement one or more machine learning techniques, which may help to fine tune interpretation of a user's pressure application profile. As an example, a machine learning model may be trained for a particular user and implemented to translate user inputs to desired control actions (e.g., outputs).

As an example, an application can provide for accepting user input for additional control. For example, consider a mechanism to cancel previous input, like a double-squeeze, a mechanism to stop receiving input (e.g., on/off, voice input "pause", etc.).

As an example, a HC-HID can be movable in space without generating output. For example, a user may have body, arm and/or hand tremors that cause movements of an HC-HID in the user's hand. While the HC-HID may include one or more accelerometers and/or other motion sensors, such movements may be allowed such that unintentional movements do not result in unintentional control actions. As an example, an HC-HID may include internal memory that may store motion information, which may, for example, provide for tracking, diagnosis, etc., of a user's condition (e.g., whether tremors are getting worse, whether physical therapy is helping rehabilitate a user, etc.). In such an example, an application may provide for downloading or otherwise transmitting such information (e.g., for review by a healthcare provider, etc.).

As explained, sensors may be pressure sensors. For example, consider strain sensors (e.g., piezoelectric, etc.) such that a HC-HID operates according to pressure applied to one or more areas of the HC-HID to perform functions such as cursor navigation functions, select, drop-n-drag, etc.

Figure 7:
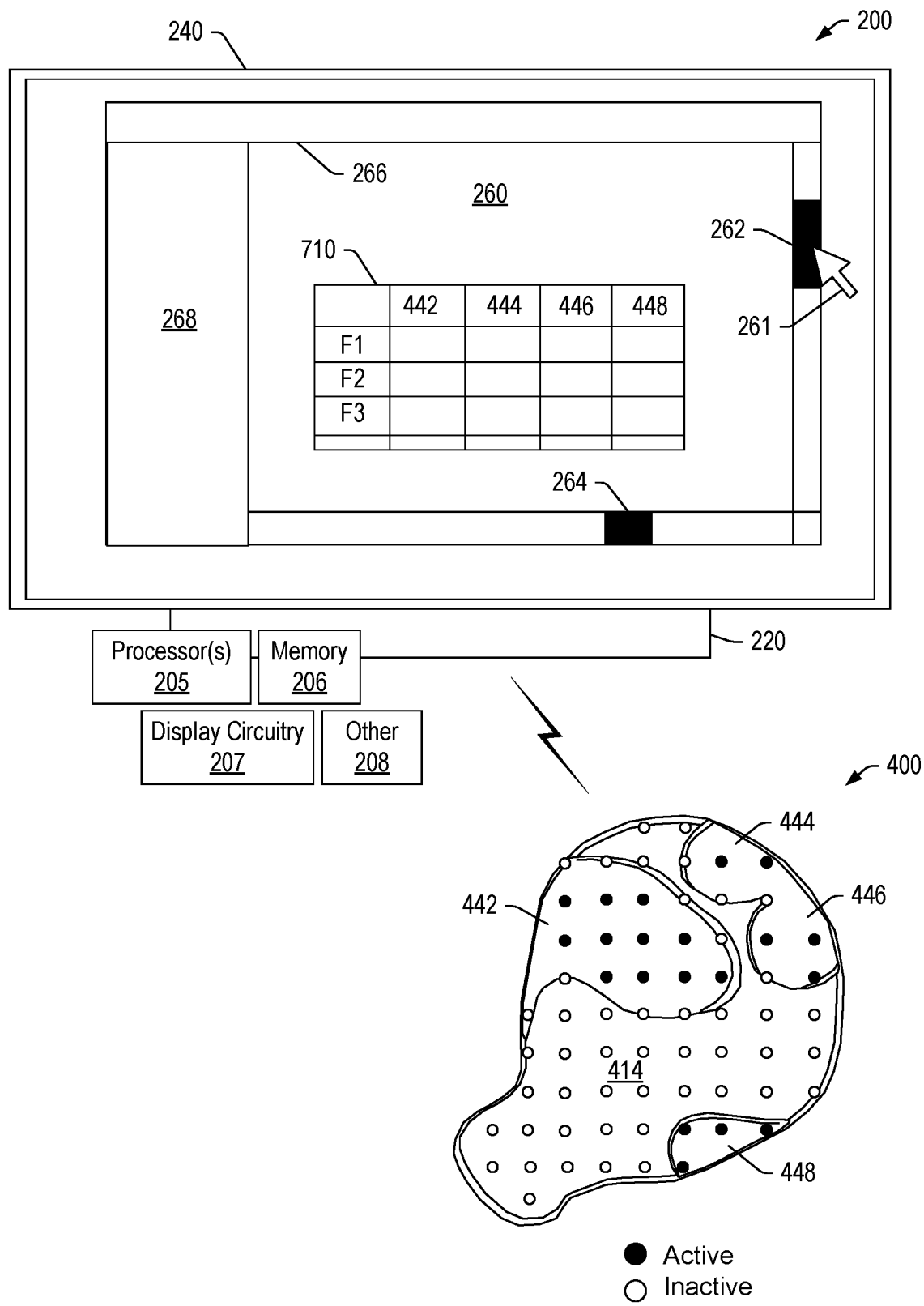
FIG. 7 is a diagram of an example of a system.

FIG. 7 shows an example of the computing device 200 as in FIG. 2 in communication with the HC-HID 400. In the example of FIG. 7, a GUI 710 is rendered to the display 240 where functions (e.g., F1, F2, F3, etc.) can be assigned to one or more of the regions 442, 444, 446 and 448 of the HC-HID 400. In the example of FIG. 7, the various functions can correspond to HID functions as may be suitable for HIDs such as a computer mouse, a trackball, a trackpad, a trackpoint device, etc.

In the example of FIG. 7, the GUI 710 may provide for assignment of functions based on one or more sequences such as, for example, a pressure sensor actuation sequence. In such an example, a pressure sensor actuation sequence can actuate a single pressure sensor region or may actuate more than one pressure sensor region. As an example, a single pressure sensor region may be for a thumb where two thumb pressure squeezes are applied in a period of time that is less than approximately 3 seconds. Such a sequence may be assigned to a particular function such that a navigation command can be executed. For example, consider the function being a double-click function. As an example, for a HC-HID, one or more functions may be extended in time depending on capabilities of a user. For example, a normal hand may perform a double-click on a computer mouse in a relatively short period of time; whereas, an impaired hand may take longer.

Figure 8:
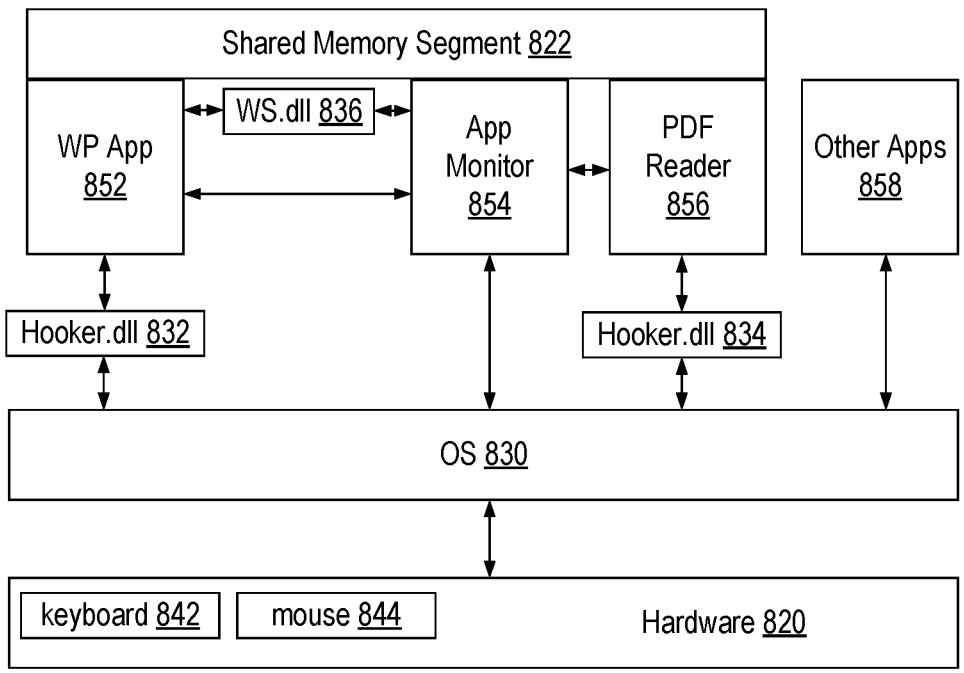
FIG. 8 is a series of diagrams of examples of architectures.
Figure 8:
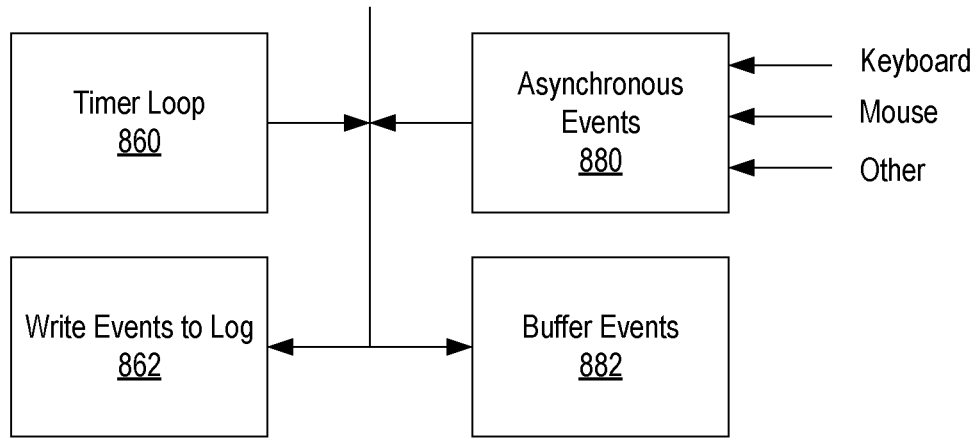

FIG. 8 shows examples of architectures and interactions between a computer mouse and a computing device. As shown, hardware 820 can support a keyboard 842 and a computer mouse 844, along with an operating system (OS) 830 that can establish an operating system environment for operation of various applications 852, 854, 856 and 858. As shown, the application 852 may be a word processing (WP) application and the application 856 may be a PDF reader application. The application 854 can be an OS related component that monitors various applications, for example, using features such as one or more dynamic link libraries (dlls or DLLs). As shown, the WP application 852 may interact with the application monitor 854 using a WS.dll 836. Further, the OS 830 may interact with various applications using dynamic link libraries such as, for example, Hooker.dll 832 and Hooker.dll 834. In the example of FIG. 8, the Hooker.dll 832 and/or the Hooker.dll 834 can intercept mouse and keyboard events, records them if necessary, and pass them to an appropriate application.

In FIG. 8, an internal scheduling architecture is shown for an example of the application monitor 854, which can provide a timer loop 860 that can be operable (e.g., every 100 ms or so) to interact with asynchronous events 880, which may originate with devices such as, for example, a keyboard, a computer mouse, etc. As shown, per a write block 862, events can be written to a log and, per a buffer block 882, events can be buffered.

In the example of FIG. 8, the timer loop 860 can handle various tasks such as, for example, interrogation of a list of known documents, interrogation of document scrollbars, and interrogation of other document properties (e.g., zoom changes, page status changes, etc.). As an example, a computer mouse may generate an event that can be directed to a document, for example, consider closing a document, minimizing a document, changing a position on a document, copying and/or pasting content in a document, deleting content in a document, scrolling in a document (e.g., change in scrollbar, etc.), zooming in a document, etc. Thus, events may be related to one or more applications via the application monitor 854 and/or one or more other approaches to performing tasks such as one or more of the tasks in the example of FIG. 8.

As explained, streams of events can originate from regular polling (e.g., one or more timer loops 860) and can originate from interrupts (e.g., device interrupts, etc., that may be asynchronous events 880). As mentioned, an internal timer can triggers every set interval (e.g., 50 ms, 100 ms, 200 ms, etc.) causing the interrogation of a list of known documents, scrollbars of all open documents and other document properties. Such an interval tends to be not short enough to capture changes in scrollbar position or zoom level that can occurred multiple times a second, but long enough to avoid performance degradation. Thus, interrupts arriving from a keyboard, a computer mouse and/or OS types of events are handled in a manner where they can be processed as they arrive. Accordingly, an architecture can include a mechanism for handling regular polling and a mechanism for handling other events.

As an example, the HC-HID 400 can be operatively coupled to a computing device via one or more of the examples of architectures and interactions shown in FIG. 8 and described herein. In the example of FIG. 8, the computer mouse 844 may be replaced and/or supplemented by the HC-HID 400. As to the asynchronous events 880, these may include events generated by the HC-HID 400.

Figure 9:
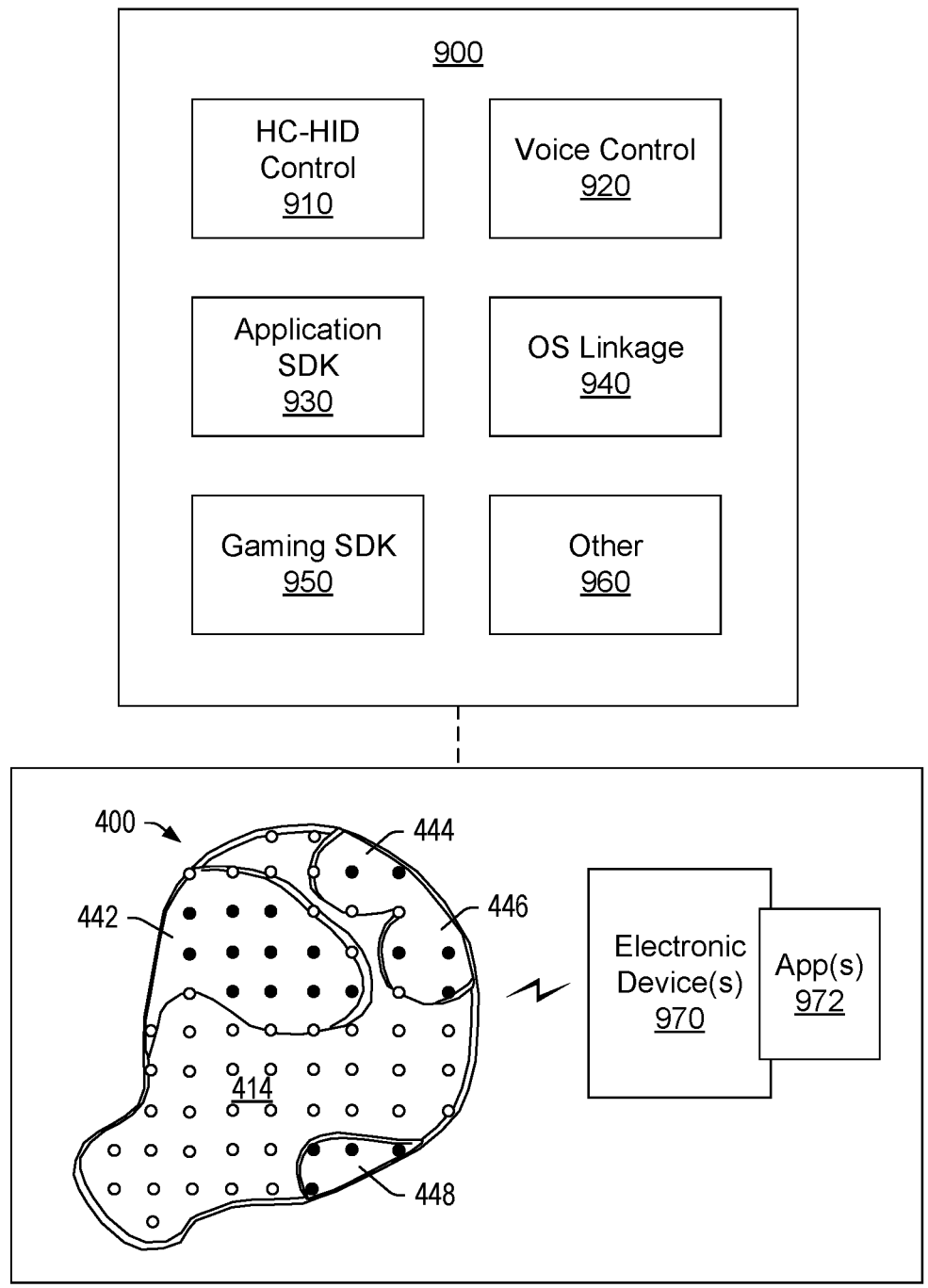
FIG. 9 is a diagram of an example of a framework, an example of a HC-HID and an example of one or more electronic devices that can execute one or more applications.

FIG. 9 shows an example of a framework 900 that includes a HC-HID control block 910, a voice control block 920, an application software development kit (SDK) block 930, an OS linkage block 940, a gaming SDK block 950 and one or more other blocks 960 (e.g., healthcare data, etc.), along with an example of one or more electronic devices 970, examples of one or more applications 972, and an example of the HC-HID 400. In the example of FIG. 9, the HC-HID 400 can include one or more features of the computer mouse 100.

As an example, the framework 900 may be utilized with one or more HC-HIDs, computer mice, etc. As an example, a software development kit (SDK) may be utilized to integrate one or more functions of a HC-HID into an application, a game, etc., for example, by using API calls, hooks, etc.

As an example, a human input device can include a processor; memory accessible to the processor; communication circuitry operatively coupled to the processor; pressure sensors operatively coupled to the processor and assignable to different navigation commands communicable via the communication circuitry; and a deformable material disposed over the pressure sensors that, upon deformation, provides for assignment of one or more of the pressure sensors to one or more of the different navigation commands. In such an example, the human input device can include a driver application executable in an operating system environment of a computing device. For example, consider a driver application that includes a learning mode that, responsive pressure sensor actuation, performs the assignment of the one or more of the pressure sensors to one or more of the different navigation commands. In such an example, the pressure sensor actuation can be or can include a pressure sensor actuation sequence. For example, with reference to the example of FIG. 6, consider a user applying pressure to the thumb region 442 followed by applying pressure to the index finger region 444. Such a sequence may be assigned to a particular navigation function. For example, consider such a sequence causing a navigation command to scroll (e.g., scroll up, scroll down, scroll left, scroll right, etc.). As an example, a sequence may utilize one or more sensor regions. For example, consider a double-click type of sequence that utilizes the thumb region 442 or the index finger region 444.

As an example, a pressure sensor actuation sequence can actuate a single pressure sensor region of pressure sensors or a pressure sensor actuation sequence can actuate more than one pressure sensor region of pressure sensors.

As an example, a driver application for a human input device can provide for reception of audio input, for example, consider a driver application that receives audio input as feedback. In such an example, audio input may be utilized to confirm or deny an assignment of one or more pressure sensors to one or more different navigation commands.

As an example, a driver application can implement a machine-learning model that provides for assignment of the one or more pressure sensors to one or more of different navigation commands. As an example, a machine-learning model may learn user preferences, which may be based on application, rendered content, etc. As an example, where a user is positioned in front of a display of a computing device and content rendered by an application is in book form, a machine-learning model may learn that a particular squeeze corresponds to the user's intent to turn a page. Such a squeeze may be sensed using one or more sensor regions. As an example, a driver application can provide for rendering of a notification to a display such that a user can see that the driver application has appropriately translated the user's input to the proper command. In the instance that input is not properly translated, the user may grip the HC-HID tightly with all available fingers to indicate that the command is incorrect. For example, consider application of a maximum force (e.g., above a certain threshold, which may be a summation of forces from different regions) that can be interpreted as a user indicating that an error has occurred in translation. In such an example, the driver application can ask for user feedback, which may be, for example, in one or more forms (e.g., voice, etc.). In such an example, the feedback can be utilized to train a machine-learning model. Such an approach may allow a user with an impaired hand to tailor a HC-HID to the user's intentions, optionally with reduced demand for GUI navigations, etc.

As an example, a human input device can include a board, where pressure sensors are mounted to the board. In such an example, deformable material can surround the board. For example, consider the example HC-HID 400 as shown in FIG. 5 where the materials 415 and 417 can be deformable. In such an example, the material 415 may be deformable for hand customization of input regions for the sensor array 440 while the material 417 may be deformable for purposes of fit to hand, rather than for input as the surface 418 can be a palm side surface that faces a user's palm whereas the surface 414 can be a finger side surface with various finger impressions that can form one or more finger regions for input. As explained, as an example, pressure sensors may be mounted to a single side of a board.

As an example, a human input device can include a battery and wireless charging circuitry operatively coupled to the battery.

As an example, a human input device can include deformable material that is permanently deformable. For example, consider a foam where a hand can crush various cells such that the cells are plastically deformed without an ability to rebound. In such an example, the foam may be permanently deformed by application of force by a hand.

As an example, a human input device can include deformable material that is resiliently deformable. For example, consider a material that can regain an original shape or a deformable shape through relaxation, heating, etc.

As an example, a human input device can include a deformable material that is or that includes a foam. As explained, a foam may be a memory foam or another type of foam.

As an example, a human input device can include a deformable material that includes a deformable state transitionable to a hardened state. For example, consider the deformable state as being a green state transitionable to the hardened state via heating and/or the deformable state being transitionable to the hardened state via polymerization. As an example, a deformable state can be a heated state that is transitionable to a hardened state via cooling.

As an example, a human input device can include planar dimensions less than 15 cm by 15 cm. In such an example, the human input device can include planar dimensions greater than 4 cm by 4 cm. As an example, a human input device can include a thickness of less than 3 cm between a palm and a finger in a deformed state.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 10:
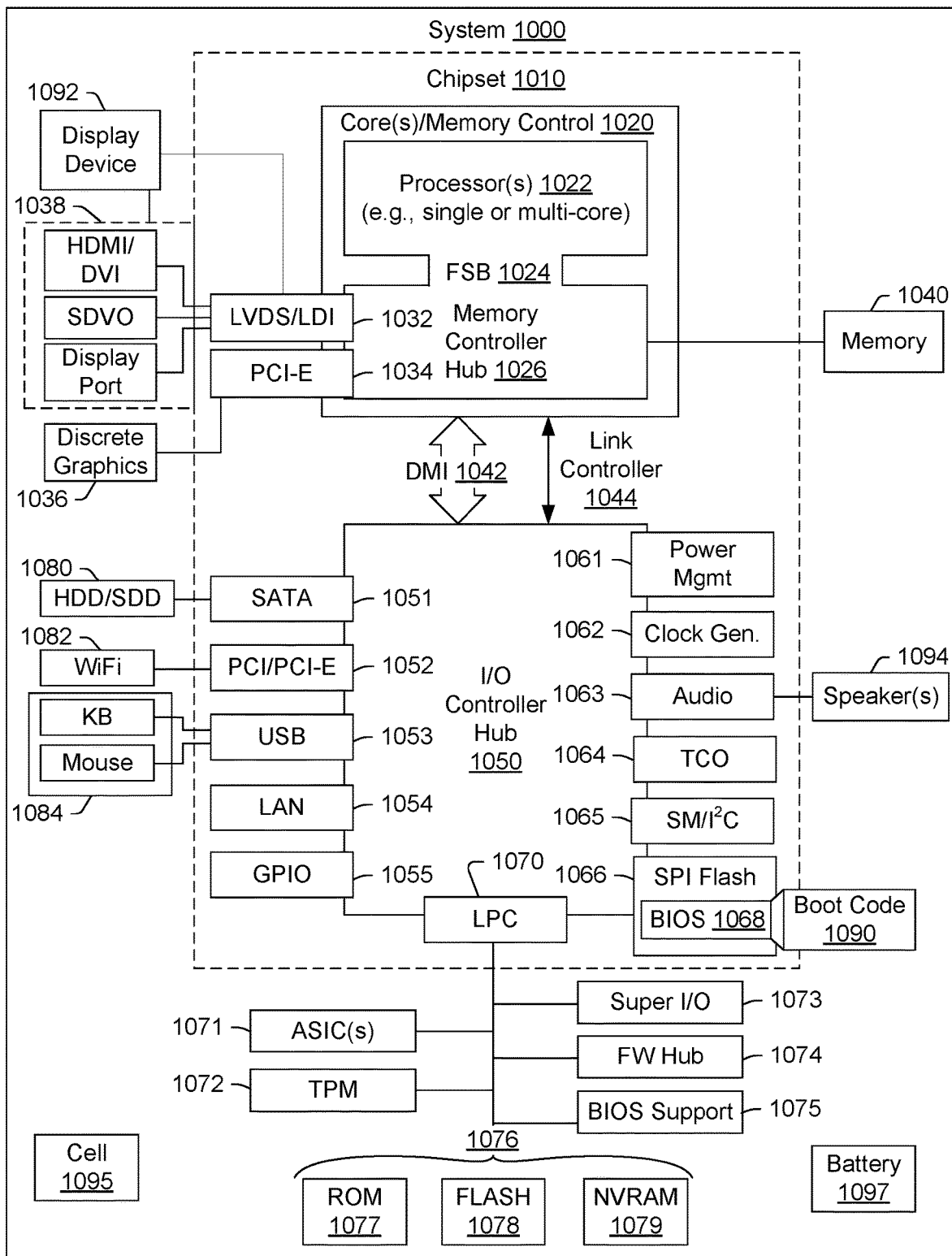
FIG. 10 is a diagram of an example of a system.

While various examples of circuits or circuitry have been discussed, FIG. 10 depicts a block diagram of an illustrative computer system 1000. The system 1000 may be a computer system sold by Lenovo (US) Inc. of Morrisville, NC (e.g., a THINKSTATION system, a THINKPAD system, etc.); however, as apparent from the description herein, a satellite, a base, a display, a dock, a keyboard, a computing device, a server or other machine may include one or more features and/or other features of the system 1000.

As an example, a monitor or display may include features such as one or more of the features included in one of the LENOVO IDEACENTRE or THINKCENTRE "all-in-one" (AIO) computing devices (e.g., sold by Lenovo (US) Inc. of Morrisville, NC). For example, the LENOVO IDEACENTRE A720 computing device includes an INTEL CORE I7 processor, a 27 inch frameless multi-touch display (e.g., for HD resolution of 1920×1080), a NVIDIA GEFORCE GT 630M 2 GB graphics card, 8 GB DDR3 memory, a hard drive, a DVD reader/writer, integrated BLUETOOTH and 802.11b/g/n WI-FI, USB connectors, a 6-in-1 card reader, a webcam, HDMI in/out, speakers, and a TV tuner.

As shown in FIG. 10, the system 1000 includes a so-called chipset 1010. A chipset refers to a group of integrated circuits, or chips, that are designed to work together. Chipsets are usually marketed as a single product (e.g., consider chipsets marketed under the brands INTEL, AMD, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. As shown, the system 1000 may include one or more batteries 1097 and, for example, battery management circuitry.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A human input device comprising:
   opposing parallel, planar surfaces that extend to a perimeter, wherein the opposing parallel, planar surfaces comprise a palm side surface that faces a human palm of a human hand and that contacts the human palm and one or more proximal phalanxes of one or more fingers and a first portion of a thumb extending from the human palm of the human hand and bent over the perimeter in a contracted, claw state of the human hand, and a finger side surface that contact one or more distal phalanxes of the one or more fingers and a second portion of the thumb, as bent over the perimeter, in the contracted, claw state of the human hand;
   a processor;
   memory accessible to the processor;
   communication circuitry operatively coupled to the processor;
   a planar board;
   pressure sensors mounted to one side of the planar board and operatively coupled to the processor and assignable to different navigation commands communicable via the communication circuitry; and
   a deformable material disposed over the pressure sensors of the planar board that, upon deformation, forms one or more finger impressions on the finger side surface, responsive to contact by the one or more of the one or more distal phalanxes and the second portion of the thumb, that provide for assignment of one or more of the pressure sensors to one or more of the different navigation commands.

2. The human input device of claim 1, comprising a driver application executable in an operating system environment of a computing device.

3. The human input device of claim 2, wherein the driver application comprises a learning mode that, responsive pressure sensor actuation, performs the assignment of the one or more of the pressure sensors to one or more of the different navigation commands.

4. The human input device of claim 3, wherein the pressure sensor actuation comprises a pressure sensor actuation sequence.

5. The human input device of claim 4, wherein the pressure sensor actuation sequence actuates a single pressure sensor region of the pressure sensors.

6. The human input device of claim 4, wherein the pressure sensor actuation sequence actuates more than one pressure sensor region of the pressure sensors.

7. The human input device of claim 2, wherein the driver application receives audio input as feedback.

8. The human input device of claim 7, wherein the audio input confirms or denies an assignment of the one or more of the pressure sensors to the one or more of the different navigation commands.

9. The human input device of claim 2, wherein the driver application implements a machine-learning model that provides for the assignment of the one or more of the pressure sensors to the one or more of the different navigation commands.

10. The human input device of claim 1, wherein the deformable material surrounds the planar board.

11. The human input device of claim 1, wherein the pressure sensors are mounted to a single side of the planar board.

12. The human input device of claim 1, comprising a battery and wireless charging circuitry operatively coupled to the battery.

13. The human input device of claim 1, wherein the deformable material is permanently deformable.

14. The human input device of claim 1, wherein the deformable material is resiliently deformable.

15. The human input device of claim 1, wherein the deformable material comprises a foam.

16. The human input device of claim 1, wherein the deformable material comprises a deformable state transitionable to a hardened state.

17. The human input device of claim 16, wherein the deformable state is a heated state that is transitionable to the hardened state via cooling.

18. The human input device of claim 16, wherein the deformable state is transitionable to the hardened state via polymerization.

19. The human input device of claim 1, comprising planar dimensions less than 15 cm by 15 cm.

20. The human input device of claim 1, wherein the perimeter comprises a rounded portion and a tab portion, wherein the rounded portion of the perimeter contacts one or more proximal interphalangeal creases of the one or more fingers and a crease between the first portion and the second portion of the thumb, as bent over the perimeter in the contracted, claw state of the human hand such that the one or more proximal phalanxes and the first portion of the thumb contact the palm side surface and the one or more distal phalanxes and the second portion of the thumb contact the finger side surface, and wherein the tab portion of the perimeter extends in a direction away from the rounded portion and from a proximal crease of the human hand towards a wrist crease of the human hand in the contracted, claw state of the human hand.

\* \* \* \* \*